United States Patent
Jeon et al.

(10) Patent No.: US 10,551,986 B2
(45) Date of Patent: Feb. 4, 2020

(54) TOUCH SENSING DEVICE AND DISPLAY DEVICE INCLUDING THE SAME

(71) Applicant: Samsung Display Co., Ltd., Yongin-si (KR)

(72) Inventors: Byeong Kyu Jeon, Busan (KR); Sung Ku Kang, Suwon-si (KR); Jeong Heon Lee, Seongnam-si (KR); Hee Woong Park, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/266,164

(22) Filed: Feb. 4, 2019

(65) Prior Publication Data

US 2019/0179452 A1  Jun. 13, 2019

Related U.S. Application Data

(63) Continuation of application No. 15/936,252, filed on Mar. 26, 2018, now Pat. No. 10,198,137, which is a continuation of application No. 14/478,770, filed on Sep. 5, 2014, now Pat. No. 9,946,412.

(30) Foreign Application Priority Data

Nov. 26, 2013  (KR) .................. 10-2013-0144864

(51) Int. Cl.
*G06F 3/045* (2006.01)
*G06F 3/044* (2006.01)
*G06F 3/041* (2006.01)

(52) U.S. Cl.
CPC ............ *G06F 3/044* (2013.01); *G06F 3/0412* (2013.01); *G06F 2203/04112* (2013.01)

(58) Field of Classification Search
CPC ............. G09G 3/36; G09G 5/00; G06F 3/045
See application file for complete search history.

(56) References Cited

U.S. PATENT DOCUMENTS

| 7,196,281 | B2 | 3/2007 | Cok et al. |
| 8,363,030 | B2 | 1/2013 | Lee |
| 2009/0002337 | A1 | 1/2009 | Chang |
| 2010/0182275 | A1 | 7/2010 | Saitou |
| 2012/0113339 | A1 | 5/2012 | Park et al. |

(Continued)

FOREIGN PATENT DOCUMENTS

| KR | 10-1156945 | 6/2012 |
| KR | 10-2013-0044058 | 5/2013 |

OTHER PUBLICATIONS

Non-Final Office Action dated May 8, 2018, issued in U.S. Appl. No. 15/936,252.
Notice of Allowance dated Sep. 20, 2018, issued in U.S. Appl. No. 15/936,252.
Non-Final Office Action dated Oct. 1, 2015, issued in U.S. Appl. No. 14/478,770.

(Continued)

*Primary Examiner* — Pegeman Karimi
(74) *Attorney, Agent, or Firm* — H.C. Park & Associates, PLC

(57) ABSTRACT

A touch sensing device and a display device for improving hovering performance including: a touch sensing display panel including sense electrodes arranged in a matrix; and a sensing signal controller connected to the touch sensing display panel. The sense electrode includes a metal mesh electrode and a conductive layer contacting the metal mesh electrode.

9 Claims, 11 Drawing Sheets

(56) References Cited

U.S. PATENT DOCUMENTS

| | | | |
|---|---|---|---|
| 2012/0162584 A1* | 6/2012 | Chang | G06F 3/0412 |
| | | | 349/106 |
| 2012/0287079 A1 | 11/2012 | Sato et al. | |
| 2012/0318585 A1 | 12/2012 | Kim et al. | |
| 2013/0017321 A1 | 1/2013 | Kim et al. | |
| 2013/0038572 A1 | 2/2013 | Frey et al. | |
| 2013/0044384 A1* | 2/2013 | Kim | B05D 5/06 |
| | | | 359/885 |
| 2013/0294037 A1* | 11/2013 | Kuriki | H05K 9/00 |
| | | | 361/748 |
| 2014/0043250 A1 | 2/2014 | Yeh et al. | |
| 2014/0152910 A1 | 6/2014 | Kang et al. | |
| 2015/0084907 A1* | 3/2015 | Burberry | G06F 3/046 |
| | | | 345/174 |

OTHER PUBLICATIONS

Final Office Action dated Feb. 22, 2016, issued in U.S. Appl. No. 14/478,770.

Non-Final Office dated Jun. 13, 2016, issued in U.S. Appl. No. 14/478,770.

Final Office Action dated Oct. 27, 2016, issued in U.S. Appl. No. 14/478,770.

Non-Final Office Action dated Mar. 6, 2017, issued in U.S. Appl. No. 14/478,770.

Final Office Action dated Aug. 9, 2017, issued in U.S. Appl. No. 14/478,770.

Notice of Allowance dated Dec. 4, 2017, issued in U.S. Appl. No. 14/478,770.

* cited by examiner

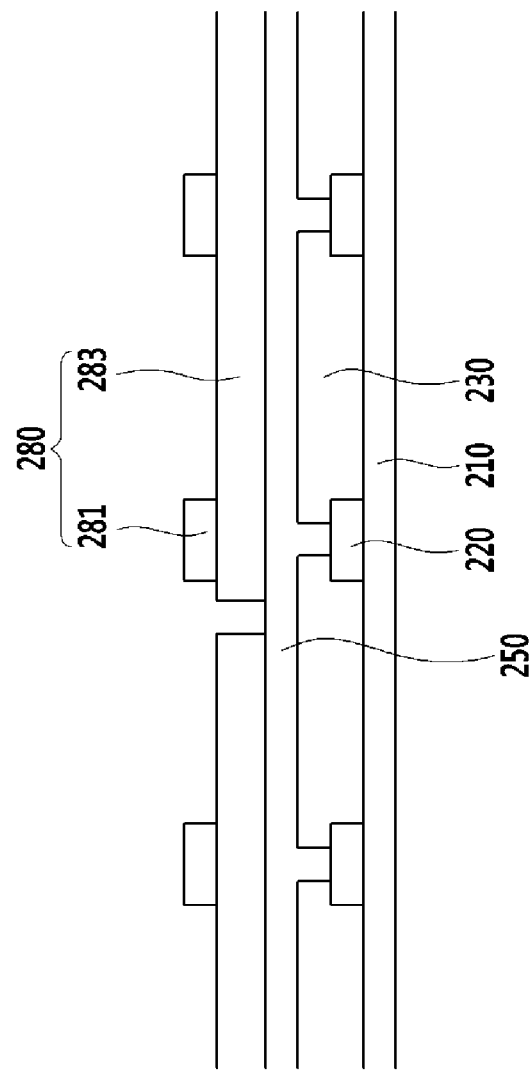

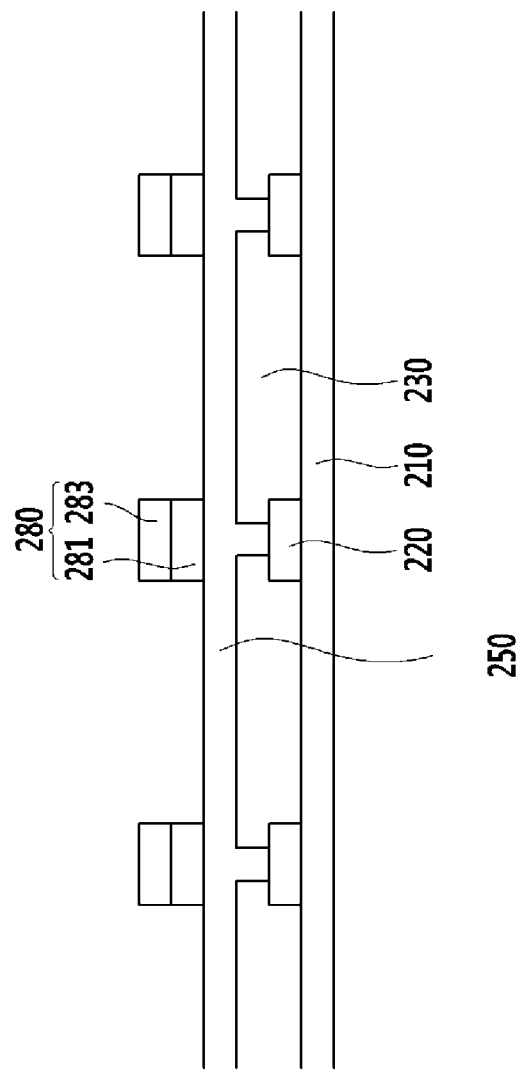

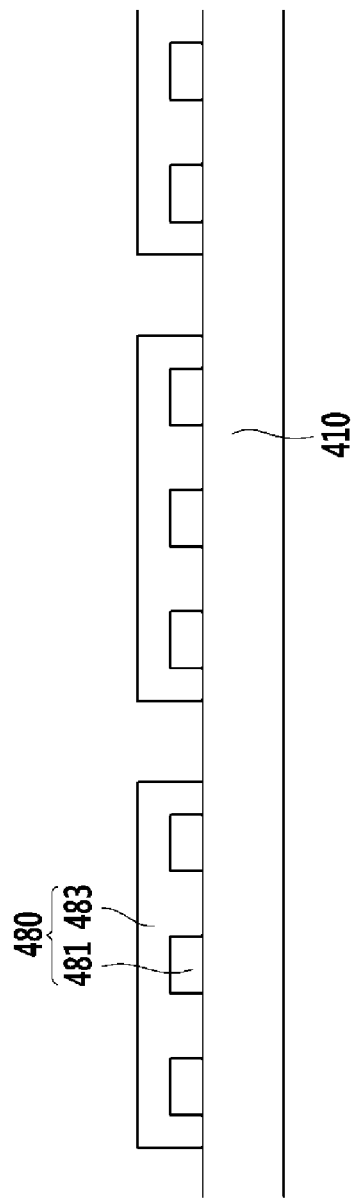

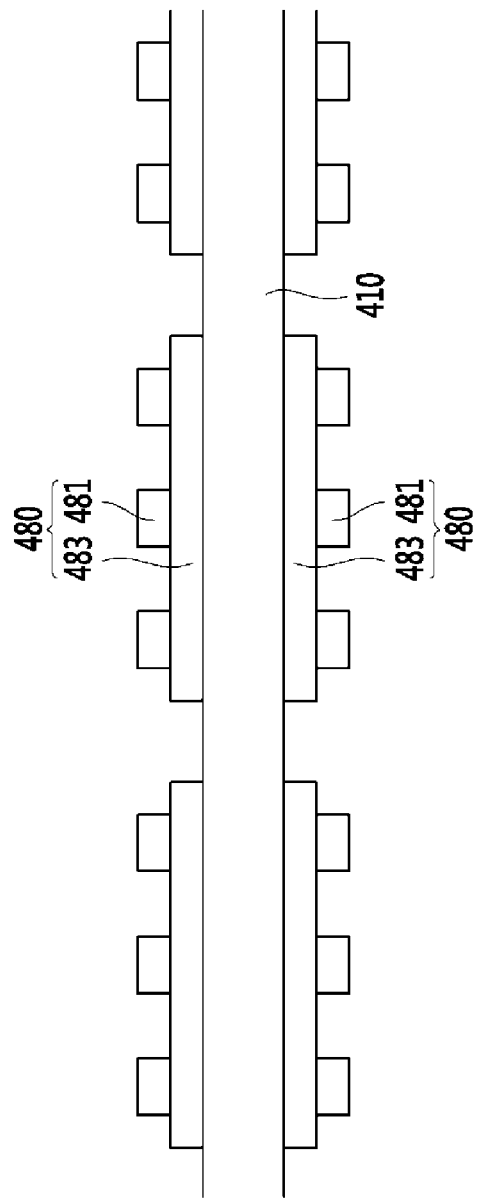

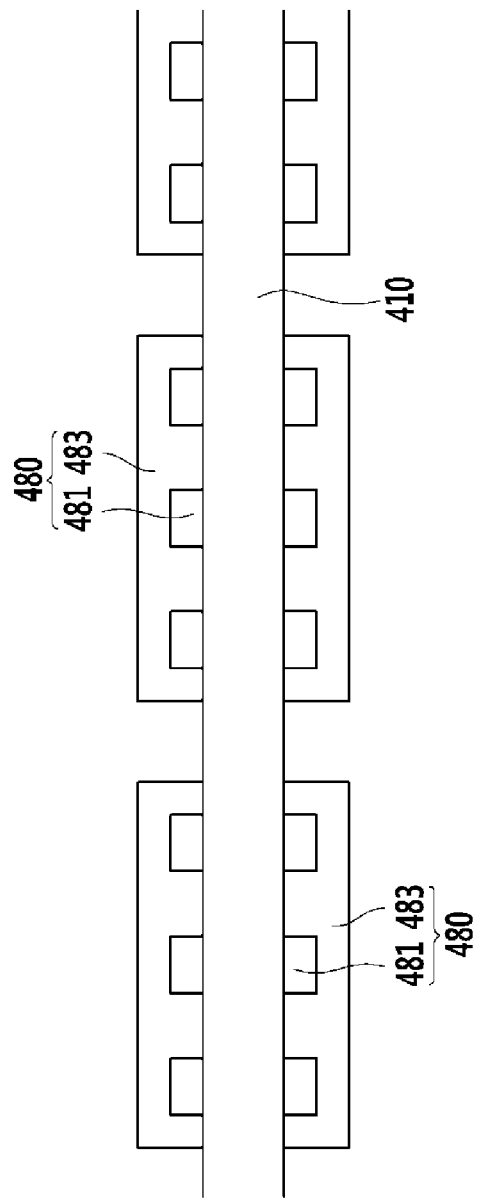

TOUCH SENSING DEVICE AND DISPLAY DEVICE INCLUDING THE SAME

CROSS-REFERENCE TO RELATED APPLICATIONS

This application is a Continuation of U.S. patent application Ser. No. 15/936,252, filed on Mar. 26, 2018, which is a Continuation of U.S. patent application Ser. No. 14/478,770, filed on Sep. 5, 2014 (now issued as U.S. Pat. No. 9,946,412), and claims priority from and the benefit of Korean Patent Application No. 10-2013-0144864, filed on Nov. 26, 2013, which are hereby incorporated by reference for all purposes as if fully set forth herein.

BACKGROUND

Field

Exemplary embodiments of the present invention relate to a touch sensing device and a display device including the same.

Discussion of the Background

A display device, such as a liquid crystal display (LCD), an organic light emitting diode (OLED) display, and an electrophoretic display, includes an electric field generating electrode and an electro-optical active layer. The liquid crystal display may include a liquid crystal layer as the electro-optical active layer, the organic light emitting diode display may include an organic emission layer as the electro-optical active layer, and the electrophoretic display may include charged particles. The field generating electrode is connected to a switch, such as a thin film transistor, to receive a data signal, and the electro-optical active layer converts the data signal to an optical signal to display an image.

Such as a display device may include a touch sensing function in which interaction with a user may be performed, in addition to a function of displaying the image. The touch sensing function is used to determine contact information. The contact information may include, for example, whether an object approaches or touches a screen, and a touch location thereof, by sensing changes in pressure, charges, light, and the like, which are applied to the screen by the display device, when the user writes text or draws figures by approaching or touching the screen using a finger or a touch pen. The display device may receive an image signal based on the contact information to display an image.

Such a touch sensing function may be implemented through a touch sensor. The touch sensor may be classified into various types, such as, for example, a resistive type, a capacitive type, an electro-magnetic (EM) type, and an optical type.

For example, the capacitive type of touch sensing sensor may include a sensing capacitor formed by a plurality of sensing electrodes which may transfer sensing signals, and senses a change in capacitance of the sensing capacitor generated when a conductor, such as a finger, approaches the touch sensor to determine existence of a touch, a touch position, and the like.

The above information disclosed in this Background section is only for enhancement of understanding of the background of the invention and therefore it may contain information that does not constitute prior art.

SUMMARY

Exemplary embodiments of the present invention provide a capacitive-type device for sensing a touch, and a display device including the same for improving performance in sensing a hovering touch.

Additional features of the invention will be set forth in the description which follows, and in part will be apparent from the description, or may be learned by practice of the invention.

An exemplary embodiment of the present invention discloses a touch sensing display panel including sense electrodes arranged in a matrix and a sensing signal controller connected to the touch sensing display panel. The sense electrode includes a metal mesh electrode and a conductive layer contacting the metal mesh electrode.

An exemplary embodiment of the present invention also discloses a thin film transistor array panel including a thin film transistor; a touch sensing display panel facing the thin film transistor array panel and including sense electrodes arranged in a matrix form; and a sensing signal controller connected to the touch sensing display panel. The sense electrode includes a metal mesh electrode and a conductive layer contacting the metal mesh electrode.

It is to be understood that both the foregoing general description and the following detailed description are exemplary and explanatory, and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

FIGS. 4, 5, 6A, 6B, 7A, 7B, and FIG. 8 show parts of a cross-sectional view and a top plan view of a touch sensing device according to another exemplary embodiment of the present invention.

DETAILED DESCRIPTION OF THE ILLUSTRATED EMBODIMENTS

Figure 1:
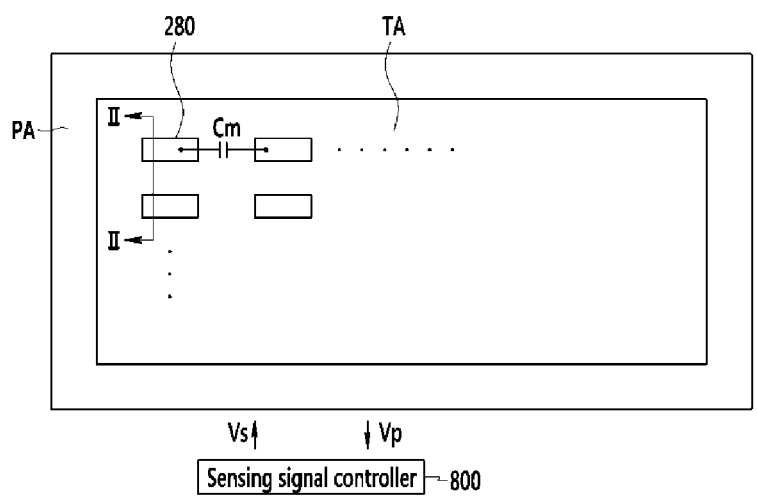
FIG. 1 shows a block diagram of a touch sensing device according to an exemplary embodiment of the present invention.

The present invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art.

In the drawings, the thickness of layers, films, panels, regions, etc., are exaggerated for clarity. Like reference numerals designate like elements throughout the specification. It will be understood that when an element such as a layer, film, region, or substrate is referred to as being "on" or "connected to" another element, it can be directly on or directly connected to the other element, or intervening elements may also be present. In contrast, when an element is referred to as being "directly on" or "directly connected to" another element, there are no intervening elements present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

A hovering touch signifies a touch recognizable by a finger or a touch pen that approaches a display area (DA). Distinguished from the hovering touch, a touch recognizable when an indicator, such as a finger or a touch pen, directly contacts a surface of the display area (DA) will be called a "surface touch". The surface touch can be detected by a touch sensor included in the display device. The touch sensor is configured to convert a pressure applied to a specific point or a change of capacitance occurring at a specific point into an electrical input signal.

Figure 2A:
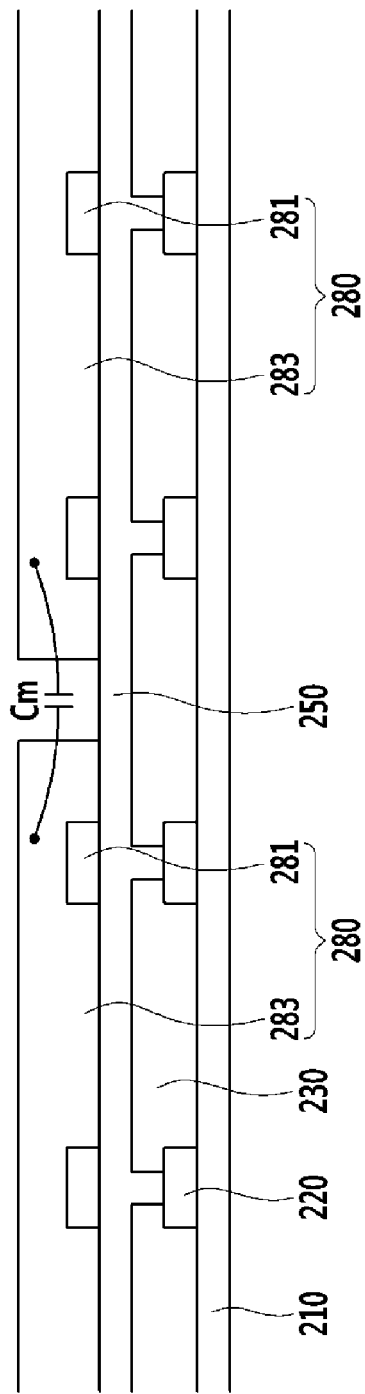
FIG. 2A and FIG. 2B show a cross-sectional view and a top plan view, respectively, of a touch sensing device according to an exemplary embodiment of the present invention.
Figure 2B:
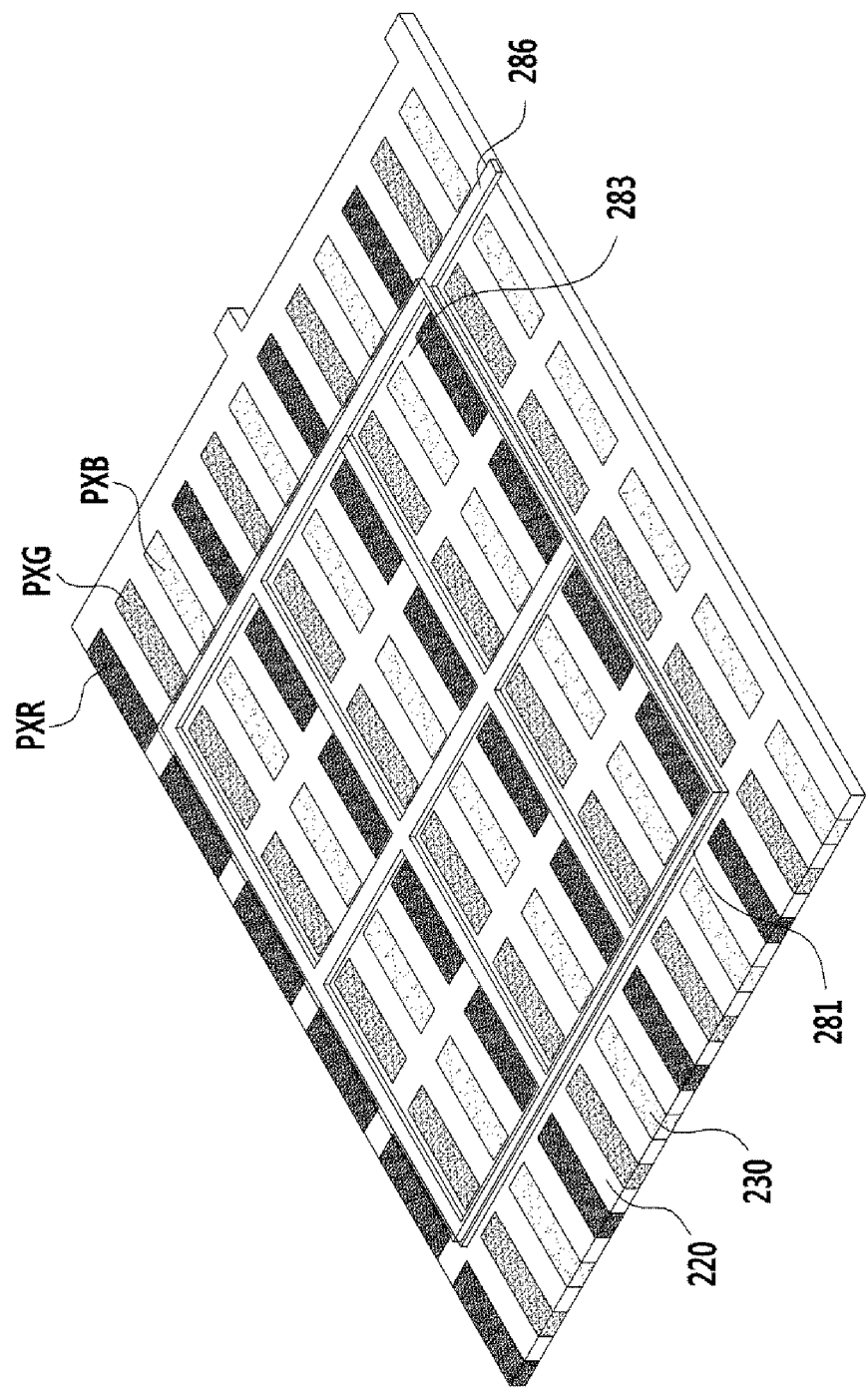

A touch sensing device according to an exemplary embodiment of the present invention will now be described with reference to FIG. 1, FIG. 2A, and FIG. 2B. FIG. 1 shows a block diagram of a touch sensing device according to an exemplary embodiment of the present invention, and FIG. 2A and FIG. 2B show a cross-sectional view and a top plan view of a touch sensing device according to an exemplary embodiment of the present invention.

Referring to FIG. 1, the touch sensing device represents a device for sensing contact by an external object, and includes a touch sensing display panel 200 on which a contact is generated, and a sensing signal controller 800 for controlling the sensing of a touch.

The touch sensing display panel 200 includes a touch area (TA) and a peripheral area (PA). The touch area (TA) represents an area in which a contact can be sensed when an object approaches or contacts the touch sensing display panel 200, and it can overlap the display area for displaying an image. In this instance, the contact includes a case in which an external object, such as a user's finger, directly touches the touch sensing display panel 200, and a "hovering touch" that represents a case in which the external object approaches the touch sensing display panel 200 or moves after the approached to the touch sensing display panel 200.

Sense electrodes 280 and signal transfer wires 286 are provided in the touch area (TA). The sense electrodes 280 can be arranged in a matrix, but the present invention is not limited thereto. A signal transfer wire 286 is connected to a sense electrode 280, and transmits a sense input signal or a sense output signal. The transfer wires 286 extend from the touch area (TA) and are provided in the peripheral area (PA). The signal transfer wires 286 are connected to the sensing signal controller 800 for controlling the touch sensing sensor, and transmit a sense input signal or a sense output signal. A light blocking member, through which no light passes, can be provided in the peripheral area (PA).

The sense electrodes 280 and the signal transfer wires 286 connected thereto configure a touch sensing sensor. The sense electrodes 280 can be arranged in an n×m matrix (n and m are natural numbers).

The touch sensing sensor can sense the contact in various ways. For example, the touch sensing sensor can be classified as a resistive type, a capacitive type, an electro-magnetic type (EM), or an optical type. The exemplary embodiment of the present invention will be described with reference to a capacitive-type touch sensing sensor.

The sensing signal controller 800 is connected to the sense electrode 280 of the touch sensing display panel 200. The sensing signal controller 800 transmits a sense input signal (Vs) to a plurality of sense electrodes 280 and receives a sense output signal (Vp) from the sense electrodes 280. The sensing signal controller 800 processes the sense output signal (Vp) to generate contact information, such as a contact state and a contact position.

When the sense electrode 280 receives the sense input signal (Vs) from the sensing signal controller 800, a sensing capacitor Cm can be formed by interaction between the sense electrodes 280. The sensing capacitor Cm may be formed by adjacent metal mesh electrodes 281 and adjacent conductive layers 283, as shown in FIG. 2A.

When a contact is generated by an external object, the amount of charge of the sensing capacitors Cm is changed, and the corresponding sense output signal (Vp) is output through the sense electrode 280. When a contact is provided by the external object, a voltage level of the sense output signal (Vp) can be less than a voltage level of the sense output signal (Vp) when the contact is not provided by the external object. In particular, it may be easy to sense the hovering touch by the conductive layer 283.

The sensing signal controller 800 receives the sense output signal (Vp), samples it, and performs an A/D conversion on it to generate a digital detection signal. The sensing signal controller 800 or an additional determination circuit can operate the digital detection signal to generate contact information, such as a contact state and a contact position.

When the touch sensing display panel 200 is attached to the display device (i.e., an add-on cell type), a transparent substrate 210 of the touch sensing display panel 200 can be provided in addition to the substrate of the display device. As opposed to this, when the sense electrode 280 is formed on an external side of the substrate of the display device (i.e., an on-cell type) or on an internal side thereof (i.e., an in-cell type), the substrate of the display device can be a transparent substrate 210 of the touch sensing display panel 200. The touch sensing display panel, according to the present invention, may use the in-cell type and, for example, a color filter 230 and a light blocking member 220 may be disposed on the transparent substrate 210. Referring to FIG. 2A and FIG. 2B, the touch sensing display panel 200 will now be described in further detail.

The sense electrode 280 and the signal transfer wire 286 are disposed on the transparent substrate 210, and the light blocking member 220 and the color filter 230 may be provided on the transparent substrate 210. In this instance, the transparent substrate 210 is divided into a touch area (TA) and a peripheral area (PA), and the sense electrode 280 is formed in the touch area (TA) so as to recognize a touch of an input object. The touch area (TA) is provided in a center of the transparent substrate 210, and the peripheral area (PA) represents a portion in which a signal transfer wire 286 electrically connected to the sense electrode 280 is formed on an edge of the touch area (TA).

The transparent substrate 210 provides support for the sense electrode 280 and the signal transfer wire 286, and provides transparency for the user to recognize an image provided by the display device. The transparent substrate may also be flexible.

In consideration of the support and the transparency, the transparent substrate 210 may be made of polyethylene terephthalate (PET), polycarbonate (PC), polymethyl methacrylate (PMMA), polyethylene naphthalate (PEN), polyether sulfone (PES), a cyclo olefin copolymer (COC), a triacetylcellulose (TAC) film, a polyvinyl alcohol (PVA) film, a polyimide (PI) film, polystyrene (PS), a biaxially oriented PS (BOPS) including a K resin, glass, or tempered glass, but the present invention is not restricted thereto.

The light blocking member 220 is formed on the transparent substrate 210, and the color filter 230 is provided on the transparent substrate 210 exposed by an opening region of the light blocking member 220. That is, the transparent substrate 210 includes the light blocking member 220 having a regularly formed opening region, and the color filter 230 provided in the opening region of the light blocking member 220.

The light blocking member 220 divides the transparent substrate 210 into a plurality of opening regions for forming the color filter 230, and prevents light interference between adjacent opening regions and blocks external light. An overcoat layer 250 may be provided to smooth the surfaces of the color filter 230 and the light blocking member 220.

Sense electrodes 280 can be provided on the overcoat layer 250 and they may be arranged in a matrix. The sense electrodes 280 may sense the change of the charge stored in the sensing capacitor Cm, and thereby recognize touch coordinates.

The sense electrodes 280 may include the metal mesh electrode 281 and the conductive layer 283. The metal mesh electrode 281 and the conductive layer 283 can be formed of different materials, and hence, the capacitance of a sensing capacitor Cm occurring between the metal mesh electrodes 281 may be different from capacitance of a sensing capacitor Cm occurring between the conductive layers 283. In particular, the capacitance of the sensing capacitor Cm formed with a transparent conductive material having great resistance may be greater, which allows easier sensing of the hovering touch.

The metal mesh electrode 281 generates a signal when an input object performs a touch so as to recognize touch coordinates, and the metal mesh electrode is provided in the touch area (TA) of the transparent substrate 210.

As shown in FIG. 2B, a pattern of the metal mesh electrode 281 is formed when a plurality of unit electrode lines having a fine width are arranged in parallel in a row direction and a column direction, while crossing each other. That is, the metal mesh electrode 281 can have a lattice shape according to the arrangement of the unit electrode lines, and it can have a closed shape. Further, the metal mesh electrode 281 can be made of a low-resistance metal, such as copper (Cu) or aluminum (Al).

The metal mesh electrode 281 receives a sense input signal (Vs) from the sensing signal controller 800 and outputs a sense output signal (Vp). The sensing signal controller 800 processes the sense output signal (Vp) to generate contact information such as a contact state and a contact position.

Upon receiving a sense input signal (Vs) from the sensing signal controller 800, the metal mesh electrode 281 is charged, and forms a sensing capacitor Cm with the adjacent metal mesh electrode 281. When a contact is applied by an external object, the amount of charge stored in the sensing capacitor Cm is changed and a corresponding sense output signal (Vp) is output. A surface touch is then sensed.

The conductive layer 283 is provided on the metal mesh electrode 281, and covers the metal mesh electrode 281 included in one sense electrode 280. The conductive layer 283 has a planar shape, and can be provided in an empty space between unit electrode lines. That is, the conductive layer 283 contacts the metal mesh electrode 281 and covers an opening region provided in the metal mesh electrode 281 forming one sense electrode 280.

The conductive layer 283 can be made of a transparent conductive material, such as ITO, IZO, AgNW, CNT, graphene, a metal mesh, or a conductive polymer, but the present invention is not limited thereto.

Upon receiving a sense input signal (Vs) from the sensing signal controller 800, the conductive layer 283 forms a charged sensing capacitor Cm. The conductive layer 283 has a planar shape; is wider than the metal mesh electrode 281; and is made of a transparent conductive material with high resistance, so it is advantageous to sense the hovering touch.

That is, when a contact is applied by an external object, the amount of charge stored in the sensing capacitor Cm by the conductive layer is varied, and a corresponding sense output signal (Vp) is output. In this instance, because the sensing capacitor Cm is generally formed between the adjacent conductive layers 283, the sensing capacitor Cm has a large capacitance, and is formed in a vertical direction with respect to the transparent substrate 210. Therefore, the hovering touch can be easily sensed.

Further, each sense electrode 280 includes a conductive layer 283 and a metal mesh electrode 281, and the sense electrodes 280 can be distinguished by separations between the conductive layers 283. That is, the conductive layer 283 included in one sense electrode 280 is separated from the conductive layer 283 included in an adjacent sense electrode 280.

As described, each sense electrode 280, including the metal mesh electrode 281 and the conductive layer 283, can form a self-sensing capacitor Cs as a touch sensing sensor. Upon receiving the sense input signal, the self-sensing capacitor Cs may be charged, and when a contact of an external object, such as a finger, is provided, the stored amount of charge is varied, and a sense output signal that is different from the input sense input signal can be output. Contact information, such as a contact state and a contact position, can be determined by the changed sense output signal. In particular, the sense electrode 280 can sense the surface touch through the metal mesh electrode 281; sense the hovering touch through the conductive layer 283; and provide a device for allowing easier sensing of touches.

The signal transfer wire 286 for receiving an electrical signal from the metal mesh electrode 281 is provided on an edge of the metal mesh electrode 281. The signal transfer wire 286 can be printed by using screen printing, gravure printing, or inkjet printing, for example.

It is desirable to form the signal transfer wire 286 with a silver paste (Ag) paste or an organic silver material having excellent electrical conductivity, and it is also possible to use a low-resistance metal including a metal oxide or a metal, for example, a conductive polymer, carbon black (including CNT), or ITO.

The sensing signal controller 800 controls the touch sensing sensor. The sensing signal controller 800 can transmit a sense input signal to the sense electrode 280 or a sense output signal therefrom through the signal transfer wire 286. The sensing signal controller 800 processes the sense output signal to generate contact information, such as a contact state and a contact position. The sensing signal controller 800 may be mounted on a flexible printed circuit film in an IC chip form to be attached to the touch sensing display panel, or mounted on a separate printed circuit substrate, but the present invention is not limited thereto.

A display device according to an exemplary embodiment of the present invention will now be described with reference to FIG. 1 to FIG. 3. The display device can include a lower display panel 100 and an upper display panel 200 facing each other, and a liquid crystal layer 3 disposed between the display panels 100 and 200. In this instance, the lower display panel 100 can be a thin-film transistor array panel, and the upper display panel 200 can be the above-described touch sensing display panel.

The display device includes a display area (DA) (which corresponds to the touch area (TA) of the touch sensing device) in which pixels (PXR, PXG, and PXB) for displaying an image are formed, and a peripheral area (PA) provided in a peripheral region of the display area (DA), as shown in FIG. 1.

The pixels (PXR, PXG, and PXB) can be substantially arranged in a matrix. One pixel (PX) may include at least one switch (Q) and connected to a driving signal line, and at least one pixel electrode 191 connected thereto. The switch (Q) may include at least one thin film transistor and may be integrated to the lower display panel 100. The switch (Q) is controlled by a gate signal and transmits a data voltage to the pixel electrode 191. The respective pixels (PXR, PXG, and PXB) may display a corresponding image according to the data voltage applied to the pixel electrode 191.

The respective pixels (PXR, PXG, and PXB) can each display one primary color (i.e., spatial division) so as to realize color expression, or they can alternately display the primary colors with respect to time (i.e., temporal division), so that a desired color may be recognized as a temporal or spatial sum of the primary colors. The primary colors may exemplarily be red, green, and blue (i.e., three primary colors) or yellow, cyan, and magenta. The plurality of adjacent pixels (PXR, PXG, and PXB) for displaying different primary colors configure a dot which may represent a specific color or white.

A driver (not shown) for driving a plurality of pixels (PX) or a plurality of pads connected to the driver may be provided in the peripheral area (PA).

Figure 3:
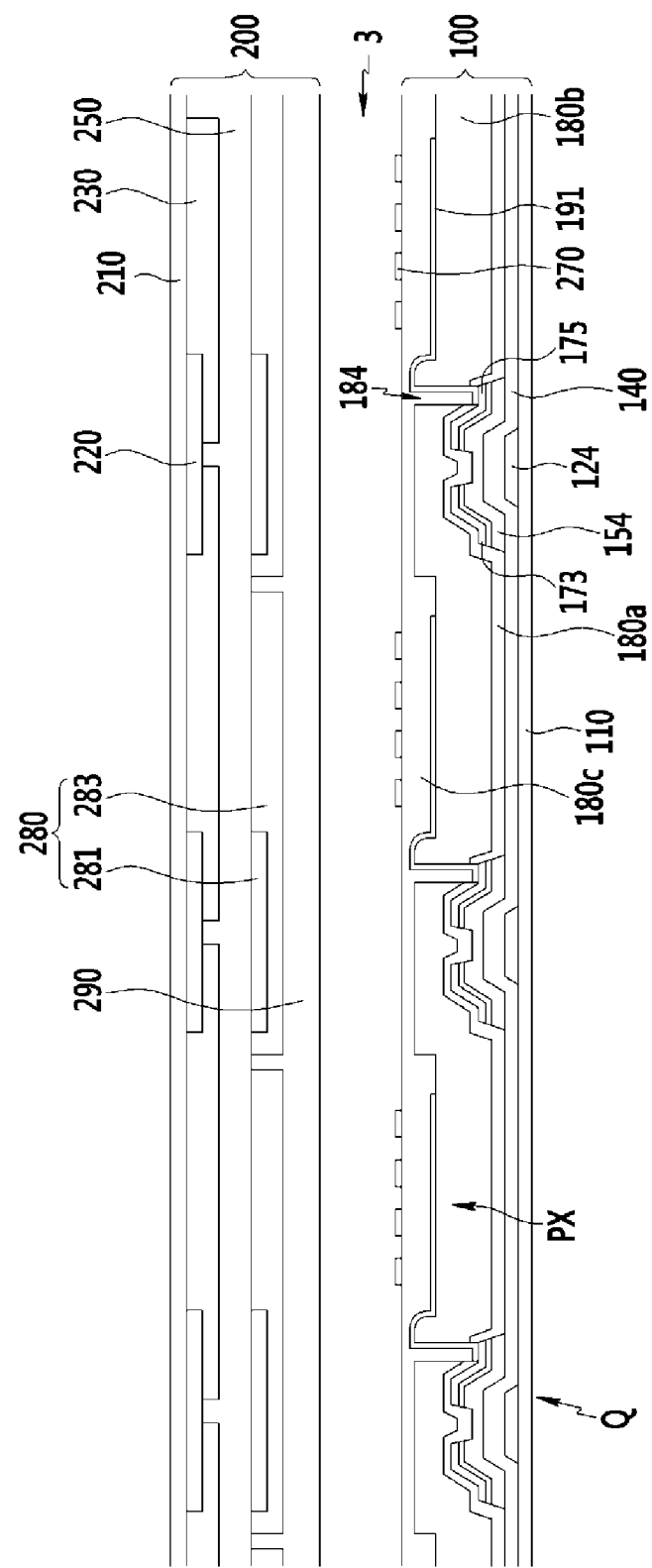
FIG. 3 shows a cross-sectional view of a part of a display device according to an exemplary embodiment of the present invention.

Referring to FIG. 3, regarding the lower display panel 100, a gate electrode 124 is provided on an insulation substrate 110. The gate electrode 124 is connected to a gate line (not shown) and receives a gate signal. The gate line transmits the gate signal and it is generally extended in the horizontal direction.

A gate insulating layer 140 is formed on the gate electrode 124. The gate insulating layer 140 can be made of an inorganic insulator, such as a silicon nitride ($SiN_x$) or a silicon oxide ($SiO_x$).

A semiconductor 154 is formed on the gate insulating layer 140. The semiconductor 154 overlaps the gate electrode 124, and it may include amorphous silicon, polysilicon, or an oxide semiconductor.

A source electrode 173 and a drain electrode 175 that face each other are provided on the semiconductor 154. The source electrode 173 is connected to a data line (not shown) and it can receive a data voltage. The data line transmits the data voltage, and it may be generally extended in the vertical direction and may cross the gate line. The drain electrode 175 is separated from the data line.

The gate electrode 124, the source electrode 173, and the drain electrode 175 configure a thin film transistor (TFT) (Q) together with the semiconductor 154, and a channel of the thin film transistor is formed on the semiconductor 154 between the source electrode 173 and the drain electrode 175.

A first passivation layer 180a is provided on the source electrode 173, the drain electrode 175, the gate insulating layer 140, and an exposed part of the semiconductor 154. The first passivation layer 180a can be made of an organic insulating material or an inorganic insulating material.

A second passivation layer 180b can be further provided on the first passivation layer 180a. The second passivation layer 180b can be made of an organic insulating material, and its surface can be planar. The second passivation layer 180b may have a different thickness depending on position. The second passivation layer 180b may be omitted.

The first passivation layer 180a and the second passivation layer 180b include a contact hole 184 for revealing the drain electrode 175.

The pixel electrode 191 is provided on the second passivation layer 180b. The pixel electrode 191 can be electrically connected to the drain electrode 175 through the contact hole 184.

The pixel electrode 191 may be overlapped by a common electrode 270 with an insulating layer 180c therebetween. FIG. 3 shows an example in which the common electrode 270 is provided above the pixel electrode 191, but the common electrode 270 can instead be provided below the pixel electrode 191, or can be provided on the touch sensing display panel 200.

According to the exemplary embodiment shown in FIG. 3, the common electrode 270 overlapping the electrode 191 may include branch electrodes overlapping the pixel electrode 191. Common electrodes 270 provided on the pixels (PXR, PXG, and PXB) can be connected to each other to transmit the same common voltage (Vcom).

Regarding the touch sensing display panel 200 that is an upper display panel, the light blocking member 220 and the color filter 230 may be formed on the transparent substrate 210, which is made of transparent glass or plastic. The light blocking member 220 is also called a black matrix, and it blocks light leakage between the pixels (PXR, PXG, and PXB). The color filter 230 displays one of three primary colors, including red, green, and blue. At least one of the light blocking member 220 and the color filter 230 can be provided on the lower display panel 100.

The overcoat layer 250 for covering the color filter 230 and the light blocking member 220 may be provided on the color filter 230 and the light blocking member 220. When at least one of the color filter 230 and the light blocking member 220 is provided on the lower display panel 100, the overcoat layer 250 can be omitted.

Referring to FIG. 1 or FIG. 2A, sense electrodes 280 may include an end portion (not shown). The end portion may be provided in the peripheral area (PA) of the display panel. An insulating layer 290 that corresponds to the end portion of the sense electrode 280 may include a contact hole (not shown) for revealing the end portion. A contact assistant (not shown) may be provided on the end portion of the sense electrode 280. The contact assistant may be electrically connected to the end portion of the sense electrode 280 through a contact hole. The end portion of the sense electrode 280 represents a terminal for detecting a sensing voltage, and it is connected to an external circuit, such as the sensing signal controller 800.

Sense electrodes 280 can be provided on the overcoat layer 250, and they may be arranged in a matrix. The sense electrodes 280 sense a change of the charge amount stored in the capacitor, to thereby recognize the touch coordinates.

The sense electrodes 280 can include the metal mesh electrode 281 and the conductive layer 283. The metal mesh electrode 281 and the conductive layer 283 can be made with different materials, such that the capacitance of the sensing capacitor Cm generated in the metal mesh electrode 281 may be different from capacitance of the sensing capacitor Cm generated between the conductive layers 283. In particular, the capacitance of the sensing capacitor Cm formed with a transparent conductive material may be greater to provide ease in sensing the hovering touch. However, in the case of sensing the voltage level change amount of the sensing capacitor Cm, the sensing capacitor Cm formed of the metal mesh electrode 281 and the sensing capacitor Cm formed of a conductive layer 283 are included.

The metal mesh electrode 281 generates a signal and recognizes touch coordinates when an input object performs a touch, and it is provided in the touch area (TA) of the transparent substrate 210.

A pattern of the metal mesh electrode 281 is formed when a plurality of unit electrode lines having a fine width are arranged in parallel in a row direction and a column direction and cross each other. That is, the metal mesh electrode 281 can have a lattice shape according to the arrangement of the unit electrode lines, and it may be a closed shape.

In particular, the metal mesh electrode 281 can be provided to correspond to a part of the light blocking member 220. Because the color filter 230 is provided in an opening region of the light blocking member 220, and the metal mesh electrode 281 corresponds to a part of the light blocking member 220, the color filter 230 can be provided between unit electrode lines forming the metal mesh electrode 281. In this instance, the color filters 230 can be provided between the unit electrode lines, and without being restricted to this, one color filter 230 can be provided therebetween. The metal mesh electrode 281 can be made of a low-resistance metal, for example, copper (Cu) or aluminum (Al).

The metal mesh electrode 281 receives a sense input signal (Vs) from the sensing signal controller 800 and outputs a sense output signal (Vp). The sensing signal controller 800 processes the sense output signal (Vp) to generate contact information, such as a contact state and a contact position.

Upon receiving the sense input signal (Vs) from the sensing signal controller 800, the metal mesh electrode 281 forms a charged sensing capacitor Cm. When a contact is generated by an external object, the amount of charges stored in the sensing capacitor Cm is changed, and the corresponding sense output signal (Vp) is output. In this instance, the sensing capacitor Cm is formed between the adjacent metal mesh electrodes 281, thereby allowing easier sensing of the surface touch.

The conductive layer 283 is provided on the metal mesh electrode 281 and covers the metal mesh electrode 281 included in one sense electrode 280. The conductive layer 283 has a planar shape with respect to a flat surface, and can be provided in an empty space between unit electrode lines. That is, the conductive layer 283 contacts the metal mesh electrode 281 and covers an opening region provided in the metal mesh electrode 281 forming one sense electrode 280.

The conductive layer 283 can be made of a transparent conductive material. For example, the conductive layer can be made of ITO, IZO, AgNW, CNT, graphene, a metal mesh, and a conductive polymer, but the present invention is not limited thereto.

Upon receiving a sense input signal (Vs) from the sensing signal controller 800, the conductive layer 283 forms a charged sensing capacitor Cm. The sensing capacitor Cm is formed between the adjacent conductive layers 283, and the conductive layer 283 may have a planar shape and is wider than the metal mesh electrode 281, so it is advantageous to sense the hovering touch.

When a contact is applied by an external object, the charge amount of the sensing capacitor Cm is varied, and a corresponding sense output signal (Vp) is output. In this instance, the sensing capacitor Cm is generated between the adjacent conductive layers 283; it has a large capacitance; and it is formed in a vertical direction with respect to the transparent substrate 210. Therefore, the hovering touch can be easily sensed.

As described, each sense electrode 280, including the metal mesh electrode 281 and the conductive layer 283, can form a self-sensing capacitor Cs as a touch sensing sensor. Upon receiving the sense input signal, the self-sensing capacitor Cs can be charged, and when a contact of an external object, such as a finger, is provided, the stored charge amount is varied, and a sense output signal that is different from the input sense input signal can be output. Contact information, such as a contact state and a contact position, can be known through the changed sense output signal.

The sense electrode 280 can sense the surface touch through the metal mesh electrode 281, and can sense the hovering touch through the conductive layer 283, thereby providing a device for allowing easier sensing of touches.

The conductive layer 283 included in the sense electrode 280 is a film which blocks noise generated by the thin film transistor array panel 100, and realizes a display device with excellent performance.

In addition, the conductive layer 283 covers the metal mesh electrode 281 such that when the metal mesh electrode 281 is cut or damaged by the flexible transparent substrate 210, the conductive layer 283 can maintain its performance.

The signal transfer wire 286 for receiving an electrical signal from the metal mesh electrode 281 is provided on an edge of the metal mesh electrode 281. The signal transfer wire 286 can be printed by using screen printing, gravure printing, or inkjet printing.

The signal transfer wire 286 may be formed with a silver (Ag) paste or an organic silver material having excellent electrical conductivity, and it is also possible to use a low-resistance metal, including a metal oxide or a metal, for example, a conductive polymer, carbon black (including CNT), or ITO.

The touch sensing display panel 200 may further include the insulating layer 290 provided on the sense electrodes 280.

The liquid crystal layer 3 is provided between the thin film transistor array panel 100 and the touch sensing display panel 200, and includes liquid crystal molecules (not shown) having dielectric anisotropy.

The liquid crystal molecules may be aligned so that long axes thereof are parallel to the panels 100 and 200 without applying an electric field to the liquid crystal layer 3, resulting in liquid crystal molecules having positive dielectric anisotropy. The liquid crystal molecules may be nematic liquid crystal molecules in which a long-axis direction is spirally twisted up to the upper display panel 200 from the lower display panel 100.

A light unit (not shown) for generating light and providing it to the display panels 100 and 200 may be further included outside the substrate 110 of the thin film transistor array panel 100.

The pixel electrode 191, to which the data voltage is applied, generates an electric field to the liquid crystal layer 3 together with the common electrode 270, to which the common voltage (Vcom) is applied, thereby determining a direction of the liquid crystal molecules of the liquid crystal layer 3 and displaying an image.

Further, a polarization film (not shown) may be attached to outsides of the thin film transistor array panel 100 and the counter display panel 200.

FIG. 3 shows a cross-sectional view of a part of a display device according to an exemplary embodiment of the present invention. However, the present invention is not restricted to the liquid crystal display. That is, it can be an organic light emitting device, an electrophoretic display, an electro-wetting display device, or a MEMS display device.

Figure 8:
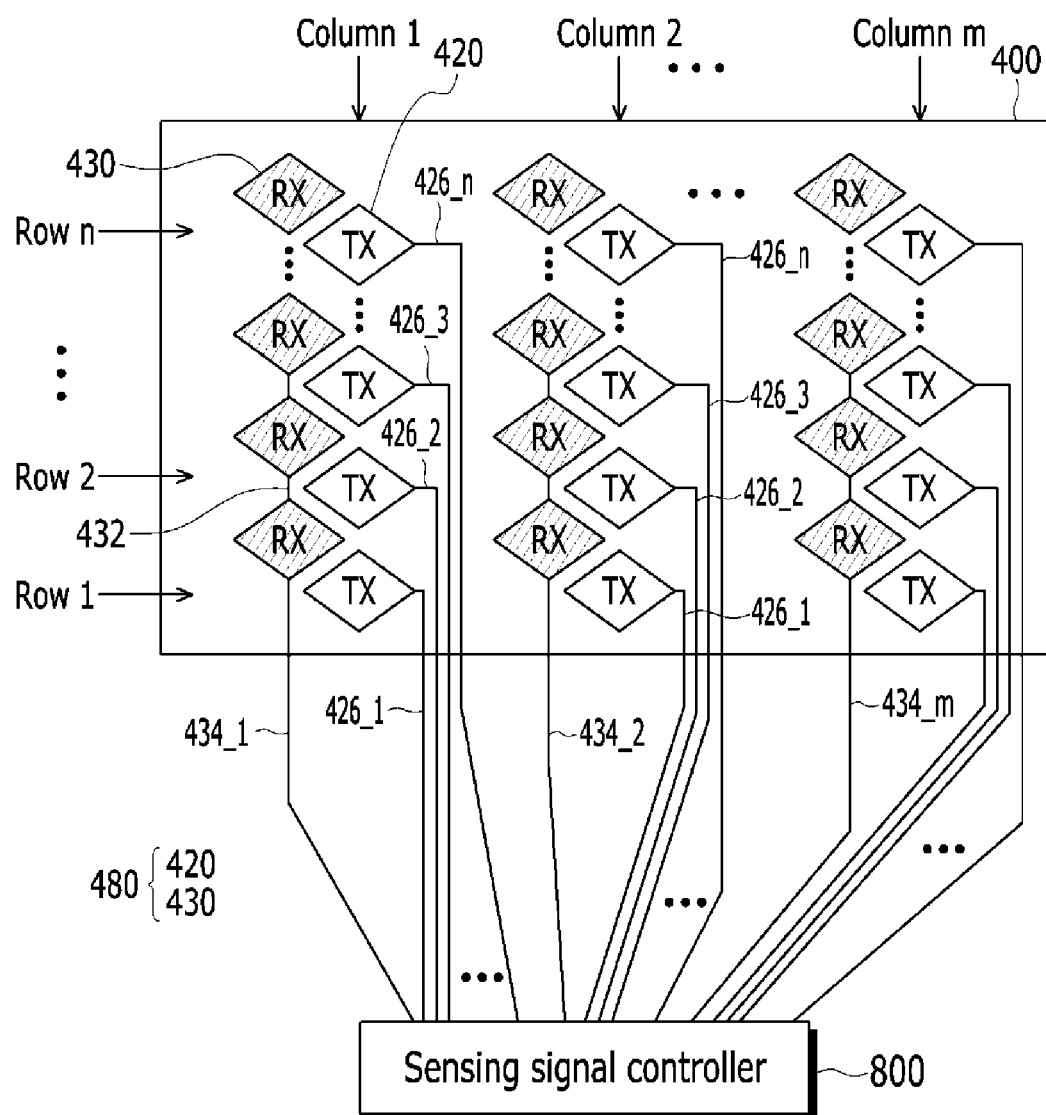

A touch sensing device according to another exemplary embodiment of the present invention will now be described with reference to FIG. 4 to FIG. 8. FIG. 4 to FIG. 7 show another exemplary embodiment of different positions and shapes of a sense electrode in comparison with the previous exemplary embodiment of the present invention, and FIG. 8 shows another exemplary embodiment of a different driving method in comparison with the previous exemplary embodiment of the present invention. Description of the same constituent elements as the above-described constituent elements will be omitted.

Referring to FIG. 4, a touch sensing device has a conductive layer 283 disposed on an overcoat layer 250, as compared to the exemplary embodiment of FIG. 2. That is, positions of the conductive layer 283 and a metal mesh electrode 281 are changeable in the sense electrodes 280 provided on the overcoat layer 250.

According to this, a process for forming the touch sensing device includes forming a plurality of plate-type conductive layers 283 on the overcoat layer 250, and forming each metal mesh electrode 281 on the conductive layers 283 to form the sense electrode 280.

In the present exemplary embodiment, the metal mesh electrode 281 may have a lattice pattern, a capacitor may be formed between the adjacent metal mesh electrodes 281, and a capacitor may be formed between the adjacent conductive layers 283. That is, the touch is sensed by a sum of the capacitors and, more particularly, it is easy to sense the hovering touch through the capacitor formed between the conductive layers.

Referring to FIG. 5, according to another exemplary embodiment of the present invention, the metal mesh electrode 281 and the conductive layer 283 included in the sense electrode 280 have shapes that correspond to each other. That is, when the metal mesh electrode 281 is provided as a lattice on the overcoat layer 250, the conductive layer 283 also has a lattice shape and overlaps the metal mesh electrode 281.

Although the present invention has been described such that the conductive layer 283 is provided on the metal mesh electrode 281, the positions of the metal mesh electrode 281 and the conductive layer 283 are interchangeable so the metal mesh electrode 281 may be provided over the conductive layer 283.

The lattice-shaped metal mesh electrodes 281 that neighbor each other in the corresponding sense electrode form a sensing capacitor Cm and are charged, and the lattice-shaped conductive layer 283 forms a sensing capacitor Cm together with the conductive layer 283 of another adjacent sense electrode 280 and is charged with a predetermined amount of charges. The sensing capacitor Cm formed by the metal mesh electrode is formed in a direction that is parallel to the transparent substrate 210, and the sensing capacitor Cm formed by the conductive layer 283 is formed in a direction that is perpendicular to the substrate. Therefore, it is easy to sense the surface touch by a change of capacitance of the sensing capacitor Cm caused by the metal mesh electrode, and it is easy to sense the hovering touch by a change of the sensing capacitor Cm caused by the conductive layer.

Figure 6A:
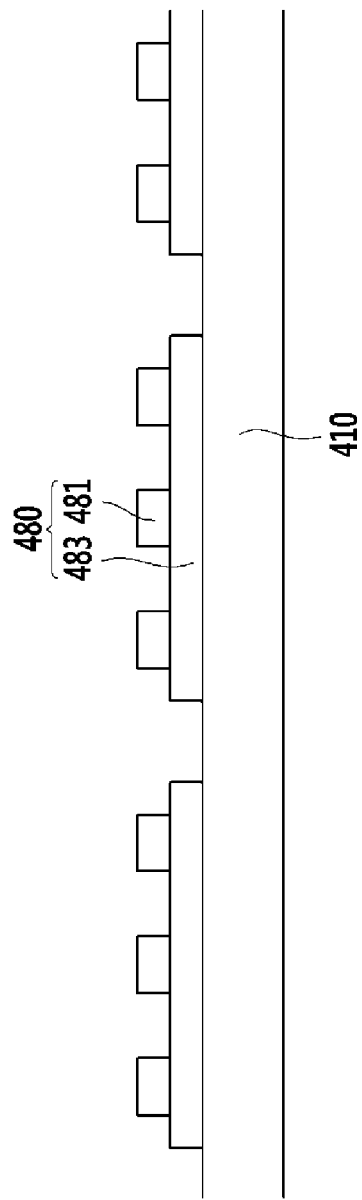

Referring to FIG. 6A and FIG. 6B, the color filter 230 and the light blocking member 220 are omitted in comparison with the previous exemplary embodiment. That is, differing from the previous display device, the present exemplary embodiment realizes a touch sensing display panel attached to the display device (i.e., an add-on cell type) so that a substrate 410 of the touch sensing display panel may be provided, in addition to the substrate of the display device. Also, a sense electrode 480 may be formed on an external side of the substrate of the display device (i.e., an on-cell type).

A plurality of sense electrodes 480 may be provided on the substrate 410, and, for example, the sense electrodes 480 may be arranged in a matrix. Further, the sense electrodes 480 may include a metal mesh electrode 481 and a conductive layer 483. The sense electrodes 480 sense the change of charge stored in the capacitor and, thereby, recognize touch coordinates.

The metal mesh electrode 481 generates a signal so as to recognize touch coordinates when an input object performs a touch, and it is provided in the touch area (TA) of the transparent substrate 410.

A pattern of the metal mesh electrode 481 is formed when unit electrode lines having a fine width are arranged in parallel in a row direction and a column direction, and cross each other. That is, the metal mesh electrode 481 can have a lattice shape and, for example, it can have a closed shape. The metal mesh electrode 481 can be made of low-resistance metal, such as copper (Cu) or aluminum (Al).

The conductive layer 483 is provided on the metal mesh electrode 481. The conductive layer 483 contacts the metal mesh electrode 481 and covers an opening region provided between the adjacent metal mesh electrodes 481.

As described, each sense electrode 480 including the metal mesh electrode 481 and the conductive layer 483 can form a self-sensing capacitor Cs as a touch sensing sensor. Upon receiving the sense input signal, the self-sensing capacitor Cs can be charged, and when a contact of an external object, such as a finger, is provided, the stored amount of charge is varied, and a sense output signal that is different from the input sense input signal can be output. Contact information, such as a contact state and a contact position, can be determined as a result of the changed sense output signal.

Referring to FIG. 6B, an exemplary embodiment in which a conductive layer 483 is provided on a metal mesh electrode 481 is provided. In this instance, the conductive layer 483 covers the metal mesh electrode 481 and fills an opening region between the metal mesh electrodes 481 having a lattice shape. Another configuration or operation may correspond to that of the exemplary embodiment of FIG. 6A.

FIG. 7A and FIG. 7B shows an exemplary embodiment in which the exemplary embodiment shown in FIG. 6A and FIG. 6B is provided on respective sides with respect to the substrate 410.

Referring to FIG. 7A, conductive layers 483 and metal mesh electrodes 481 provided thereon are formed on the substrate 410 to provide sense electrodes 480.

In a like manner, conductive layers 483 and metal mesh electrodes 481 provided thereon are formed on a lower side of the substrate to provide sense electrodes 480.

As described, each sense electrode 480 including the metal mesh electrode 481 and the conductive layer 483 can form a self-sensing capacitor Cs as a touch sensing sensor. Upon receiving the sense input signal, the self-sensing capacitor Cs can be charged, and when a contact of an external object, such as a finger, is provided, the stored charge amount is varied, and a sense output signal that is different from the input sense input signal can be output. Contact information, such as a contact state and a contact position, can be determined as a result of the changed sense output signal.

The exemplary embodiment of FIG. 7B shows different positions of the conductive layer 483 and the metal mesh electrode 481 from the exemplary embodiment of FIG. 7A. That is, the metal mesh electrode 481 is provided at an upper side of the substrate 410, and a conductive layer 483 for covering the metal mesh electrode 481 is provided thereon.

The above-noted configuration is applicable to the lower side of the substrate, the metal mesh electrode 481 is provided at the lower side, and a conductive layer 483 for covering the metal mesh electrode 481 is provided thereon.

As described, each sense electrode 480, including the metal mesh electrode 481 and the conductive layer 483, can form a self-sensing capacitor Cs as a touch sensing sensor. Upon receiving the sense input signal, the self-sensing capacitor Cs can be charged, and when a contact of an external object, such as a finger, is provided, the stored charge amount is varied, and a sense output signal that is different from the input sense input signal can be output. Contact information, such as a contact state and a contact position, can be determined as a result of the changed sense output signal.

Referring to FIG. 8, a touch sensing display panel 400 of the touch sensing device according to the exemplary embodiment of the present invention is similar to the above-described exemplary embodiments, and at least a part of the sense electrode 480 of the touch sensing display panel 400 may form sense output electrodes connected to each other.

In detail, regarding sense electrodes arranged in a matrix form according to an exemplary embodiment of the present invention, sense electrodes arranged on a first column can be connected to each other through a connector 432, which can form a sense output electrode 430. Sense electrodes arranged on another column that is adjacent to the first column are not connected to each other and can form a sense input electrode 420. In this instance, the sense electrodes that are arranged on different columns are not connected to each other. However, they may also be connected in a row direction by using a bridge. In this case, the sense electrode and the bridge may be formed on different layers with an insulating layer therebetween.

That is, a sense input electrode (Tx) 420 and a sense output electrode (Rx) 430 may be alternately provided in the column direction; the sense input electrodes 420 are not connected to each other; and the sense output electrode 430 can be connected between sense electrodes provided on the same column.

Each sense output electrode column can be connected to the sensing signal controller 800 through output signal lines (434_1, 434_2, . . . , 434_m). A sense input signal (Vs) is transmitted to the sense input electrodes 420 connected to input signal lines (426_1, 426_2, . . . , 426_n) so the sensing capacitor is charged.

That is, the neighboring sense electrodes form sensing capacitors Cm. The sensing capacitors Cm function as touch sensing sensors and they can be mutual sensing capacitors. The sensing capacitor Cm receives the sense input signal (Vs) through the sense input electrode and outputs a change of the charge amount resulting from a contact with an external object as a sense output signal (Vp).

In detail, when a contact is applied to the touch sensing display panel 200, the charge amount of the sensing capacitor Cm is varied, and a varied sense output signal (Vp) is input to the sensing signal controller 800 through the output signal lines (434_1, 434_2, . . . , 434_m) connected to the sense output electrode. That is, when the input signal (Vs) transmitted to the sense input electrode 420 is changed into a voltage level and is then applied, the voltage level at the sense output electrode 430, that is, a second electrode of the sensing capacitor Cm, is also changed. The sensing signal controller 800 determines whether sensing is generated according to a size of a voltage level change of the sense output electrode 430.

The sense output signal (Vp) can be processed by the sensing signal processor of the sensing signal controller 800, and a digital detection signal can be generated.

The touch sensing device, and the display device including the same, provides excellent hovering touch performance sensed through the capacitor formed in a direction perpendicular to the panel. The present invention provides a simple process to reduce a processing time and expense. Further, noise produced by the display panel facing the touch sensing display panel can be reduced through the conductive layer. In addition, when applied to the flexible display device, disconnection or defects of the metal mesh electrode can be offset through the conductive layer that covers the metal mesh electrode It will be apparent to those skilled in the art that various modifications and variations can be made in the present invention without departing from the spirit or scope of the invention. Thus, it is intended that the present invention cover the modifications and variations of this invention, provided they come within the scope of the appended claims and their equivalents.

What is claimed is:

1. A display device comprising:
a thin film transistor disposed on a substrate;
a pixel electrode connected to the thin film transistor; and
a plurality of sense electrodes disposed on the thin film transistor and the pixel electrode and disposed in a first direction and a second direction,
wherein:
each of the plurality of sense electrodes comprises:
a metal mesh electrode having a lattice shape and including a plurality of openings; and
a conductive layer directly contacting the metal mesh electrode;
the display device comprises a plurality of the metal mesh electrodes and the conductive layers;
the plurality of the metal mesh electrodes are spaced apart from each other in the first and second directions; and
the plurality of the conductive layers in the plurality of sense electrodes are separated from each other.

2. The display device of claim 1, wherein:
a portion of the plurality of sense electrodes are sense input electrodes, and the remaining portion of the plurality of sense electrodes are sense output electrodes; and
a sense input electrode and a sense output electrode are alternately disposed in a first direction.

3. The display device of claim 1, wherein the conductive layer includes a plurality of openings overlapping the plurality of openings of the metal mesh electrode.

4. The display device of claim 1, wherein a surface of the conductive layer and a surface of the metal mesh electrode substantially form a same plane.

5. The display device of claim 1, wherein the plurality of openings in the metal mesh electrode are filled with the conductive layer.

6. The display device of claim 1, wherein the capacitance formed between the adjacent metal mesh electrodes is lower than the capacitance formed between the adjacent conductive layers.

7. A display device comprising:
a thin film transistor disposed on a substrate;
a pixel electrode connected to the thin film transistor; and
a plurality of sense electrodes disposed on the thin film transistor and the pixel electrode and disposed in a first direction and a second direction,
wherein:
each of the plurality of sense electrodes comprises:
  a metal mesh electrode having a lattice shape and including a plurality of openings; and
  a conductive layer directly contacting the metal mesh electrode;
a plurality of the metal mesh electrodes are spaced apart from each other in the first and second directions; and
the metal mesh electrode and the conductive layer form a unit for sensing a touch, and a plurality of the units are disposed in a same layer.

8. The display device of claim 7, wherein the plurality of the units do not overlap each other along a vertical direction with respect to the pixel electrode.

9. A display device comprising:
a thin film transistor disposed on a substrate;
a pixel electrode connected to the thin film transistor; and
a plurality of sense electrodes disposed on the thin film transistor and the pixel electrode and disposed in a first direction and a second direction,
wherein:
each of the plurality of sense electrodes comprises:
  a metal mesh electrode having a lattice shape and including a plurality of openings; and
  a conductive layer directly contacting the metal mesh electrode; and
a plurality of the metal mesh electrodes are spaced apart from each other in the first and second directions; and
a capacitance formed on the conductive layer is configured to increase sensitivity for a touch in a vertical direction with respect to the display device.

\* \* \* \* \*